United States Patent
Begeja et al.

(10) Patent No.: US 8,698,872 B2
(45) Date of Patent: Apr. 15, 2014

(54) SYSTEM AND METHOD FOR NOTIFICATION OF EVENTS OF INTEREST DURING A VIDEO CONFERENCE

(75) Inventors: Lee Begeja, Gillette, NJ (US); Zhu Liu, Marlboro, NJ (US); Bernard S. Renger, New Providence, NJ (US); Behzad Shahraray, Holmdel, NJ (US); Andrea Basso, Marlboro, NJ (US); David C. Gibbon, Lincroft, NJ (US); Sumit Kumar, Scotch Plains, NJ (US); Eric Zavesky, Hoboken, NJ (US)

(73) Assignee: AT&T Intellectual Property I, LP, Atlanta, GA (US)

(*) Notice: Subject to any disclaimer, the term of this patent is extended or adjusted under 35 U.S.C. 154(b) by 514 days.

(21) Appl. No.: 13/039,083

(22) Filed: Mar. 2, 2011

(65) Prior Publication Data

US 2012/0224021 A1    Sep. 6, 2012

(51) Int. Cl.
  *H04N 7/14* (2006.01)
  *H04L 12/16* (2006.01)
  *G06F 17/00* (2006.01)
  *G06Q 10/00* (2012.01)

(52) U.S. Cl.
  USPC ............ 348/14.08; 348/14.01; 348/14.07; 348/14.09; 348/14.11; 370/260; 701/533; 704/231; 705/1.1; 705/7.11; 709/204; 709/206; 715/726; 715/736

(58) Field of Classification Search
  USPC .......... 348/14.07, 14.08, 14.09, 14.01, 14.11; 370/260; 701/533; 704/231; 705/1.1, 705/7.11; 709/204, 206; 715/736, 726
  See application file for complete search history.

(56) References Cited

U.S. PATENT DOCUMENTS

| | | | |
|---|---|---|---|
| 5,751,337 A | | 5/1998 | Allen |
| 6,894,714 B2 * | | 5/2005 | Gutta et al. ............... 348/14.07 |
| 7,081,915 B1 * | | 7/2006 | Hamilton .................. 348/14.08 |
| 7,092,002 B2 * | | 8/2006 | Ferren et al. ............. 348/14.08 |
| 7,154,526 B2 | | 12/2006 | Foote |
| 7,908,320 B2 * | | 3/2011 | Ludwig et al. ............... 709/204 |
| 8,204,759 B2 * | | 6/2012 | Ashour et al. ............... 705/1.1 |
| 8,250,141 B2 * | | 8/2012 | Xiao et al. .................... 709/204 |
| 8,275,843 B2 * | | 9/2012 | Anantharaman et al. ..... 709/206 |
| 8,463,632 B2 * | | 6/2013 | Niazi .......................... 705/7.11 |
| 2003/0220971 A1 * | | 11/2003 | Kressin ........................ 709/204 |
| 2003/0229900 A1 | | 12/2003 | Reisman |
| 2006/0005136 A1 * | | 1/2006 | Wallick et al. ............... 715/726 |
| 2007/0050397 A1 | | 3/2007 | Hokimoto |
| 2007/0070177 A1 | | 3/2007 | Christensen |
| 2008/0069011 A1 * | | 3/2008 | Sekaran et al. ............. 370/260 |
| 2008/0195385 A1 * | | 8/2008 | Pereg et al. ................. 704/231 |
| 2010/0085415 A1 | | 4/2010 | Rahman |

(Continued)

*Primary Examiner* — Gerald Gauthier
(74) *Attorney, Agent, or Firm* — G. Michael Roebuck (57) ABSTRACT

A computer implemented method is disclosed, the method including but not limited to detecting an event of interest in video conference data for a plurality of video conference participants and notifying an end user of the event of interest. A computer readable medium is also disclosed for containing a computer program for performing the method. A computer implemented method is also disclosed for receiving at an end user device, a notification of an event of interest in a video teleconference, the method including but not limited to receiving at an end user device from a notification indicating a detection of the event of interest in video conference data from the video teleconference for a plurality of video conference participants; and sending data from the end user device to the server requesting a transcription of comments from the speaker in video teleconference.

20 Claims, 5 Drawing Sheets

(56) References Cited

U.S. PATENT DOCUMENTS

| | | | |
|---|---|---|---|
| 2010/0199189 A1* | 8/2010 | Ben-Aroya et al. | 715/736 |
| 2011/0066366 A1* | 3/2011 | Ellanti et al. | 701/201 |
| 2011/0316965 A1* | 12/2011 | Moore et al. | 348/14.09 |
| 2012/0224021 A1* | 9/2012 | Begeja et al. | 348/14.08 |
| 2013/0027506 A1* | 1/2013 | Cutler | 348/14.08 |

* cited by examiner

SYSTEM AND METHOD FOR NOTIFICATION OF EVENTS OF INTEREST DURING A VIDEO CONFERENCE

FIELD OF THE DISCLOSURE

The present disclosure relates to video teleconferencing and in particular to sending an electronic notification to an end user of an event of interest that occurs during a video teleconference.

BACKGROUND OF THE DISCLOSURE

In today's geographically diverse global working environment, it can be difficult to gather all interested parties at a single location for a conference. Thus, people are resorting more and more to virtual gatherings for a meeting via a video teleconference in lieu of physically attending a physical gathering in a single conference. Often times, however, due to the popularity of the video conference, there are more opportunities to "attend" than time allows to devote full attention to the entirety of a video conference.

SUMMARY OF THE INVENTION

A computer implemented method is disclosed, the method including but not limited to detecting an event of interest in video conference data for a plurality of video conference participants and notifying an end user of the event of interest. A computer readable medium is also disclosed for containing a computer program for performing the method. A computer implemented method is also disclosed for receiving at an end user device, a notification of an event of interest in a video teleconference, the method including but not limited to receiving at an end user device from a notification indicating a detection of the event of interest in video conference data from the video teleconference for a plurality of video conference participants; and sending data from the end user device to the server requesting a transcription of comments from the speaker in video teleconference.

DETAILED DESCRIPTION

In an illustrative embodiment, audio and video data from a video conference are analyzed for the occurrence of events of interest. When a chosen event of interest occurs, such as discussion of a particular topic, a notification is sent to an end user device to inform an end user of the occurrence. Each end user may or may not be a video conference participant. End users are allowed to select events of interest on which they are sent notifications. An event of interest can be an event occurring during the video conference such reaching a selected interest level in a topic of interest and/or a speaker of interest that they want to receive notifications. An end user's interest in a particular speaker of interest or a particular topic of interest is determined by the particular end user's profile. End users can select topics of interest and speakers of interest selected from a tag cloud of topics and speaker appearing in the video conference data.

In a particular illustrative embodiment, each end user can select their own particular topics of interest and speakers of interest on which they wish to receive notifications. The video and audio data from the video conference is analyzed and metadata generated for the video conference. The video conference metadata includes but is not limited to identification of speakers, identification of topics and identification of relationships between the speakers and the topics. In a particular illustrative embodiment, a tag cloud is also generated from the audio video data for the video conference. The tag cloud represents but is not limited to the interest, popularity and occurrence frequency of speakers and topics during a particular video conference. The tag cloud can also represent relationships between the speakers and end users and relationships between the speakers and topics.

In a particular illustrative embodiment, a global tag cloud is generated based on the popularity, frequency and interest in particular topics discussed in the video conference and the popularity and interest in speakers amongst the video conference participants. Popularity is determined by the number of end users selecting or otherwise indicating an interest in a particular speaker or topic in the video conference. Frequency is determined by the number of times a particular topic is mentioned or a particular speaker appears in a particular video conference. Interest is determined by the cumulative degree of interest for speakers and topics indicated by profiles for end users. The size and font style of text tags in the tag cloud indicates the relative weight of the tag in the tag cloud. The larger the tag, the more relative weight that has been assigned to speaker or topic represented by the tag in the tag cloud. Tags can be text or image icons representing the topic of interest or speaker of interest. Larger icons in the tag cloud indicate more relative weight assigned to the speaker or topic represented by the tag. A speaker's identity can be represented by text or by an icon or an image of the speaker's face.

The weighting of the topics in global tag cloud depends on the general interest of the video conference participants and end users in the video conference participants, speakers of interest and topics of interest represented in the tag cloud. A local tag cloud is presented locally to each end user based on the end user's selection of topics of interest and speakers of interest which appear in the end user's profile. The weighting of the local tag cloud is based interest values in the end user's profile indicating the particular end user's interest in the speakers of interest and topics of interest. The tag clouds are superimposed over the video conference display on the video conference data input and display devices available to each video conference participant.

End users can select topics of interest and speakers of interest from the global tag cloud using a video conference data input and display device (also referred to herein as an "end user device) associated with each video conference participant. The video conference data input and display device enable users input data and selections from the tag cloud using a voice input, text input and gestures indicating data input and selections from the display. End users can select topics of interest and speakers of interest from the local tag cloud using the video conference data input and display device. End users that are not participating in the video conference receive notifications on end user devices which may not be a video conference data input and display device but are devices capable of receiving data network or wireless data, including but not limited to cell phones, web tablets, personal data assistants and other network or internet enabled devices.

In a particular embodiment, a computer-implemented method is disclosed. The method includes but is not limited to detecting at a video conference processor an event of interest in video conference data for a plurality of video conference participants; and notifying an end user at an end user device of the event of interest. In another illustrative embodiment of the method, the event of interest is one of a topic of interest, a speaker of interest, increased note taking from end user devices among the video conference participants, increased interest among the video conference participants and increased discussion among the video conference participants. In another embodiment of the method, the video conference data further includes but is not limited to audio and video data, the method further including but not limited to notifying the end user at the end user device of an interest value for the event of interest based on a profile for the end user, wherein the end user profile includes but is not limited to data indicating at least one of a speaker of interest and a topic of interest.

In another embodiment of the method, the interest value further includes but is not limited to a specific interest value for the topic of interest that is specific to the end user, the method further including but not limited to sending to the end user device, electronic notes from the video conference for the event of interest. In another embodiment of the method, the method further includes but is not limited to identifying a respondent from the video conference participants that responds to the speaker of interest regarding the topic of interest; and creating an interest value for the topic of interest, the speaker of interest and the respondent. In another embodiment of the method, the method further includes but is not limited to determining a level of interest based on an emotional response to the topic of interest, wherein the emotional response is estimated from at least one of a facial expression of the respondent, a pitch of the respondent's voice and a volume of the respondent's voice. In another embodiment of the method, the method further includes but is not limited to storing notes from the video conference participants for the topic in a non-transitory computer readable storage medium; and sending the notes for a first video conference participant to an end user device for a second video conference participant.

In another particular embodiment a computer readable medium is disclosed, the computer readable medium including but not limited to a non-transitory computer readable medium containing computer program instructions that when executed by a computer, performs functions that are useful in notifying an end user of an event of interest, the computer program including but not limited to instructions to detect the event of interest in video conference data for a plurality of video conference participants; and instructions to send data to an end user device to notify an end user of the event of interest. In another embodiment of the medium, the event of interest is one of a topic of interest, a speaker of interest, increased note taking among the video conference participants, increased interest among the video conference participants and increased discussion among the video conference participants.

In another embodiment of the medium, the video conference data further includes but is not limited to audio and video data, the computer program further including but not limited to instructions to send data to an end user device to notify the end user of an interest value for the event of interest based on a profile for the end user, wherein the end user profile includes but is not limited to data indicating at least one of a speaker of interest and a topic of interest. In another embodiment of the medium, the interest value further includes but is not limited to a specific interest value for the topic that is specific to the end user, the computer program further including but not limited to instructions to send to the end user device, electronic notes from the video conference participants for the event of interest. In another embodiment of the medium, the computer program further includes but is not limited to instructions to identify a respondent from the video conference participants that responds to the speaker of interest regarding the topic and instructions to creating an interest value for the topic of interest, the speaker of interest video conference participant and the respondent video conference participant. In another embodiment of the medium, the computer program further includes but is not limited to instructions to determine a level of interest based on an emotional response to the topic, wherein the emotional response is estimated from at least one of a facial expression of the respondent, a pitch of the respondent's voice and a volume of the respondent's voice. In another embodiment of the medium, the computer program further includes but is not limited to instructions to store notes from the video conference participants for the topic; and instructions to send the notes for a first video conference participant to a second video conference participant.

In another particular embodiment a computer implemented method for receiving at an end user device, a notification of an event of interest in a video teleconference, the method including but not limited to receiving at an end user device from a server, a notification indicating a detection of the event of interest in video conference data from the video teleconference for a plurality of video conference participants; and sending data from the end user device to the server requesting a transcription of comments from the speaker in video teleconference. In another embodiment of the medium, the event of interest is one of a topic of interest, a speaker of interest, increased note taking among the video conference participants, increased interest among the video conference participants and increased discussion among the video conference participants.

In another embodiment of the medium, the video conference data further includes but is not limited to audio and video data, the computer program further including but not limited to instructions to notify the end user of an interest value for the event of interest, wherein the interest value is based on a profile for the end user, wherein the end user profile includes but is not limited to data indicating at least one of a speaker of interest and a topic of interest. In another embodiment of the medium, the interest value further includes but is not limited to a specific interest value for the topic that is specific to the end user, the computer program further including but not limited to instructions to receive at the end user device, electronic notes for the event of interest from the server. In another embodiment of the medium, the computer program further includes but is not limited to instructions to receive at the end user device, an interest value from a server for a triplet including but not limited to the topic, the speaker of interest and the respondent. In another embodiment of the medium, the interest value is determined based on an emotional response to the topic, wherein the emotional response is estimated from at least one of a facial expression of the respondent, a pitch of the respondent's voice and a volume of the respondent's voice, instructions to store notes from the video conference participants for the topic and instructions to send the notes for a first video conference participant to a second video conference participant.

Figure 1:
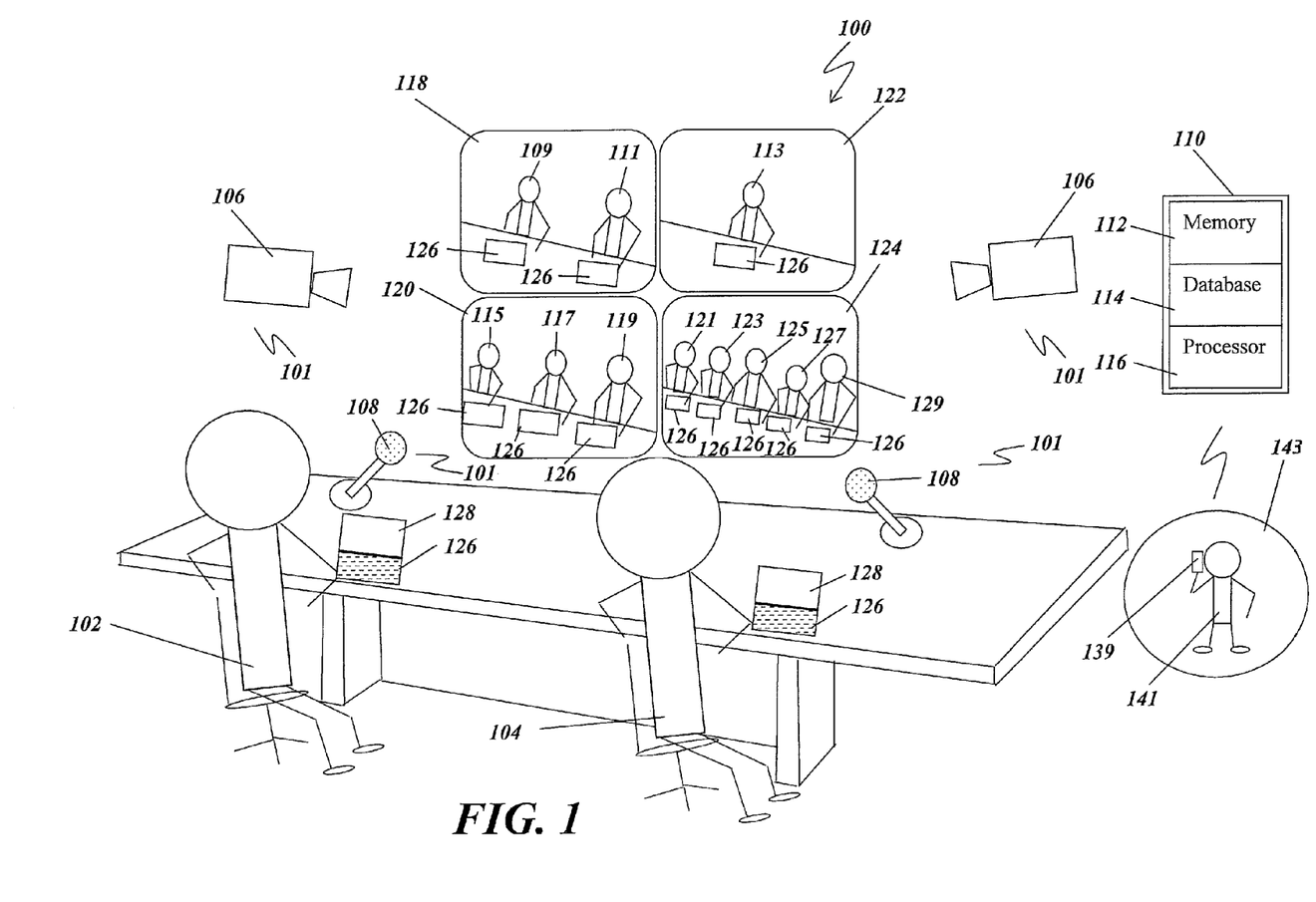
FIG. 1 depicts an illustrative embodiment of a system for notifying an end user of the occurrence of an event of interest.

Turning now to FIG. 1, in a particular illustrative embodiment, local video teleconference participants 102 and 104 sit in front of a cameras 106 and microphones 108 which captures dual channel video image data and dual channel audible conversations data from the local video teleconference participants. In another illustrative embodiment the video and audio data are each single channel data inputs to the video conference processor 110. The video and audio data sent to video conference processor 110. The video conference processor 110 includes but is not limited to a computer 112, non-transitory computer readable medium 114 and data base 116 embedded in the non-transitory computer readable medium storage. Video conference processor 110 analyzes the video and audio data and transmits analytical data from the video conference to remote video conference locations.

The local video conference participants 102 and 104 can also see video presentation screens 118, 120, 122 and 124. Each of the video presentation screens present remote video and audio data from video conference participants from different video conference locations other than the local video conference participants' location. Video presentation screen 118 presents video and audio data from remote video conference participants 109 and 111. Video presentation screen 122 presents video and audio data from remote video conference participant 113. Video presentation screen 120 shows remote video conference participants 115, 117 and 119. Video presentation screen 124 shows remote video conference participants 121, 123, 125, 127 and 129. Notifications are also sent to end user device 139 to end users 141 in remote zones 143 which are not video conference locations. Data sent to the end user devices 139 are tailored to the capabilities of the end user device to which the notification is sent. Thus, video is sent to end user devices only if the end user device is capable of processing video.

Each remote video conference location is equipped with a camera, microphone and processor for capturing video and audio data from the respective remote video conference locations. Similarly, each video conference location provides a video conference processor which analyzes the video and audio data and transmits analytical data from the video conference to remote video conference locations. In an illustrative embodiment, one of the video conference processor serves as a hub for communication with each of the other video processors. The selected hub video conference processor provides central storage and analysis of the video conference data and end user profiles data received or stored by each of the other video conference processors.

Each video conference participant is provided with a video conference data input and display device 126 to allow each video conference participant to individually view and input notes for the video conference. The notes can be created before, during or after the video conference. Notes are created using the video conference data input and display device to create a textual input, voice input, electronic pen entries, a handheld device gesturing or iconic selections associated with the video conference. The notes created by each individual video conference participant are given a video time stamp so that notes can be recalled by time and by which video conference participant authored the notes. Each video conference participant's notes are stored locally in a non-transitory computer readable storage medium and are available for transmission to other video conference participants upon request.

A running text script of the video conference conversation is scrolled in text across the each video conference data input and display device. The running text script identifies the speaker and topic associated with the text. The running text can be displayed and paused via an end user's video conference data input and display device. Selection of a topic of interest and/or speaker of interest is selected by selecting a topic of interest or speaker of interest from the paused running text. Additionally, the tag clouds and a drop-down menu of end user selectable items are displayed on the video conference data input and display device. The selectable items represented can include but are not limited to speakers of interest and topics of interested identified in the video conference data. Archive data for speakers of interest and topics of interest from previous video conference are also available from archival storage in the data base accessible by the host video conference processor.

Comments appearing in the running text script are attributed to the originating video conference participant. Each video conference participant is identified and assigned a video conference participant identification visual attribute, such as color or font, so that comments attributed to each video conference participant appear in the color or font assigned to the originating video conference participant. Topics that are discussed in the video conference running text script are identified and each topic assigned a unique topic identification visual attribute. Comments appearing in the video conference running text script are attributed to a topic by displaying the comments associated with the topic in the topic identification visual attribute for the topic. The video conference running text script can be sorted by end users so that it is displayed by topic of interest, by speaker of interest, or by a specific speaker of interest speaking on a specific topic of interest.

Notes taken by individual video conference participants are associated with a particular video conference participant by displaying the notes for the particular video conference participant in the text identification attribute for the particular video conference participant. Notes taken by an individual video conference participant are also associated with a particular video conference topic by displaying the notes for the particular video conference topic in the text identification attribute for the particular video conference participant. End users and participants can access comments and notes by topic of interest and video conference participant. For example, an end user can access all comments by video conference participant "x" or all comments on topic "y". An end user can also access all comments by video conference participant "x" on topic "y".

End users can use their video conference data input and display device to select topics or speakers from the scrolling video conference text or by clicking on a list of recent and current topics and video conference participants speaking. The end users can sort the video conference running text script to display the running text only for a specific speaker of interest, only for a specific topic of interest and only for a specific speaker of interest on a specific topic of interest. The end users are presented with a display menu the enable the end users to sort by the specific topic and by a specific speaker of interest on a specific topic of interest. Notes from each video conference participant are made available upon request to each of the other video conference participants and are made available from storage "offline", that is, passively for end users who are not actively participating in the video conference. End users and video conference participants can also select tags from tag clouds presented on end user devices and video conference data input and display devices.

In an illustrative embodiment, a profile is created for each video conference participant and for each end user. The profile is stored in the computer readable storage medium which indicates certain properties for an associated video conference participant including but not limited to an identity, end user device preferences, topics of interest and participants of interest. Video conference participant profiles and end user profiles include but are not limited to topics of interest and speakers of interest selected by or attributed to a particular end user or video conference participant. Topics of interest and speakers of interest are determined for end users and video conference participants in various ways. Interests are also determined for end users whether or not the end users have ever been a video conference participant. In a particular embodiment, speakers and topics of interest are determined by an end user or a video conference participant's selection of a topic of interest or particular video conference participant speaker of interest on which to receive notes or notifications. These speakers of interest and topics of interest are stored in the profile for the end user or video conference participant.

Documents presented during the current video conference or a past video conference are stored in the data base and associated with a particular video conference by title and date. The documents stored can include but are not limited to contributions or documents introduced during the video conference, including but not limited to news articles, slide presentations, graphs and charts, e-books and internet data discovered automatically by the system while using key words from the video conference discussion to search on the internet.

In another particular embodiment, a video conference participant's interests are determined from the video conference participant's perceived response in the video conference to particular speaker of interest or topic of interest. The perceived response can be a verbal response, note taking or a perceived emotional response to a topic of interest or a speaker of interest. Whenever a video conference participant verbally responds to a topic of interest or a speaker of interest, the response is noted in the video conference participant's profile. The perceived response can include but is not limited to note taking while a particular topic of interest is being discussed by the video conference participants or when a particular video conference participant is talking as a speaker of interest. The perceived response also includes but is not limited to perceived emotional responses of the video conference participants in reaction to particular topics of interest and particular video conference participant speakers of interest. The emotional responses can be determined for a particular individual video conference participant or in aggregate for a group of video conference participants, based on facial expressions and/or tone of voice for the video conference participants. Tone of voice for a video conference participant is indicated by voice volume and voice pitch deviations from a norm voice print established for a particular video conference participant's normal speaking voice. A perceived voice response is analyzed for the prosodic of the voice, which in terms of acoustics includes but is not limited to variation in syllable length, loudness, pitch and the formant frequencies of speech sounds.

In another embodiment, the perceived emotional response is further indicated by express gestures of approval, such as a "thumbs up" sign made by a video conference participant during a discussion on a particular topic of interest or speaker of interest. Emotional interest is also determined by a user's response including terms such as "like" in responding to a discussion on a topic of interest or speaker of interest. The emotional interest can also be determined from a question and answer session with video participants wherein they answer questions based a 5 point Likert scale wherein each video conference participant indicates emotional interest by choosing from the 5 Likert question responses as follows: Strongly Agree, Slightly Agree, Neither Agree no Disagree, Slightly Disagree and Strongly Disagree.

A video conference participant's interest in a topic can further be estimated by automatically rating a video conference participant's activities based on a frequency of use particular words or phrases used by a video conference participant. In another embodiment, the automatic rating can be based on a learned average behavior based on word frequency of transition and action words. In another embodiment, the automatic rating can be based on a learned average behavior based on length of pauses in speech by the participant, topic coherence based on a speaker's staying on a topic. The emotional interest rating can be used an indicator to a video conference speaker during a live presentation as to whether to stay on a particular topic when interest is waning or building. The emotional interest rating can be used an indicator to a video conference speaker during a live presentation as to whether to use less abstract terminology when an interest is waning or increasing. The emotional interest rating can be used an indicator to a video conference speaker during a live presentation as to whether a particular presentation is interesting enough or needs additional work.

General interest amongst all video conference participants for a particular topic of interest or video conference participant speaker of interest is estimated from monitoring the video conference participants' quantity of notes being taken, quantity of discussion and perceived emotions of the video conference participants. The quantity of notes being taken by the video conference participants while the particular video conference participant speaker of interest is talking or a particular topic of interest is being discussed by the video conference participants. Repeated general or specific interest in a topic discussed by different video conference participant speakers indicates an interest in the topic. Repeated general or specific interest in a particular video conference participant speaker discussing various topics indicates an interest in the particular video conference participant speaker. Repeated general or specific interest in a particular video conference participant speaker and or a topic can be determined for the general population of video conference participants or end users and for each particular video conference participant or end user.

Figure 2:
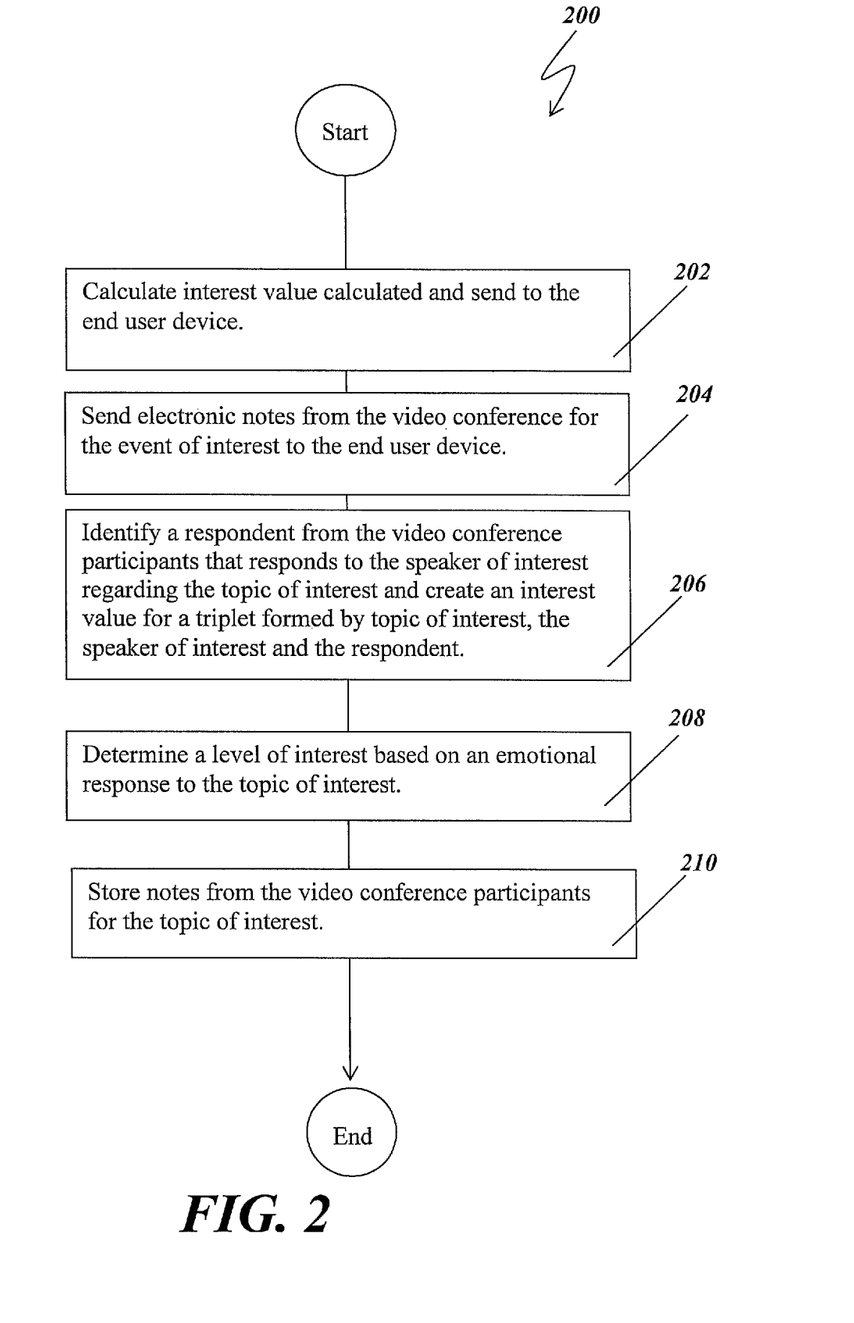
FIG. 2 depicts a flow, chart of functions performed in an illustrative method for notifying an end user of an occurrence of an event of interest.

Turning now to FIG. 2, a flow chart 200 depicting a method for notifying an end user of an event of interest is depicted. At block 202 in a particular embodiment of the method, the video conference processor detects an event of interest in video conference data for a plurality of video conference participants and notifies an end user at an end user device of the event of interest. All devices accessing the video conference data are referred to generically as "end user devices". All persons accessing the video conference data or receiving notifications from the video conference processor are referred to as "end users". Those end users whom participate in the video conference are referred to as "video conference participants". Those end users whom receive notifications without participating in the video conference are also referred to "non-participants". As discussed above, the event of interest can be but is not limited to a the discussion of a topic of interest, the appearance of a speaker of interest, the occurrence of increased quantity of note taking among the video conference participants, the occurrence of increased interest among the video conference participants and the occurrence of increased discussion among the video conference participants. The video conference data includes but is not limited to audio and video data. At block 204 an interest value is calculated and sent to the end user.

The notification of an event of interest sent to the end user at the end user device can include but is not limited to an interest value for the event of interest based on a profile for the end user. The notification of the event of interest can include but is not limited to data indicating at least one of a speaker of interest and a topic of interest. The interest value can further include but is not limited to a specific interest value for the topic of interest, wherein the specific interest value is specific to a particular end user and based on the particular end user's profile. The interest values may further include but is not limited to a general interest value. At block 206, in an illustrative embodiment, the video conference processor sends electronic notes from the video conference for the event of interest to the end user device.

At block 208, an illustrative embodiment further identifies a respondent from the video conference participants that actively responds to the speaker regarding the topic of interest and creates an interest value for a triplet formed by topic of interest, the speaker of interest and the respondent. The relationship between speaker and respondent on a particular topic adds to the interest value for the triplet of speaker-respondent-topic discussed below. The relations ship between speakers on a single topic can be stored in a video conference processor and sent to end users and video conference participants for display as a circle of friends. In block 210 an illustrative embodiment determines a level of interest based on an emotional response to the topic of interest. The emotional response is estimated from at least one of a facial expression of the respondent, a pitch and a volume of the respondent's voice. In a particular embodiment, the general interest value is also at least partially determined by emotional response of all video conference participants. At block 212 an illustrative embodiment stores notes from the video conference participants for the topic of interest in a non-transitory computer readable storage medium and sends the notes for a first video conference participant to an end user device for a second video conference participant or an end user.

Figure 3:
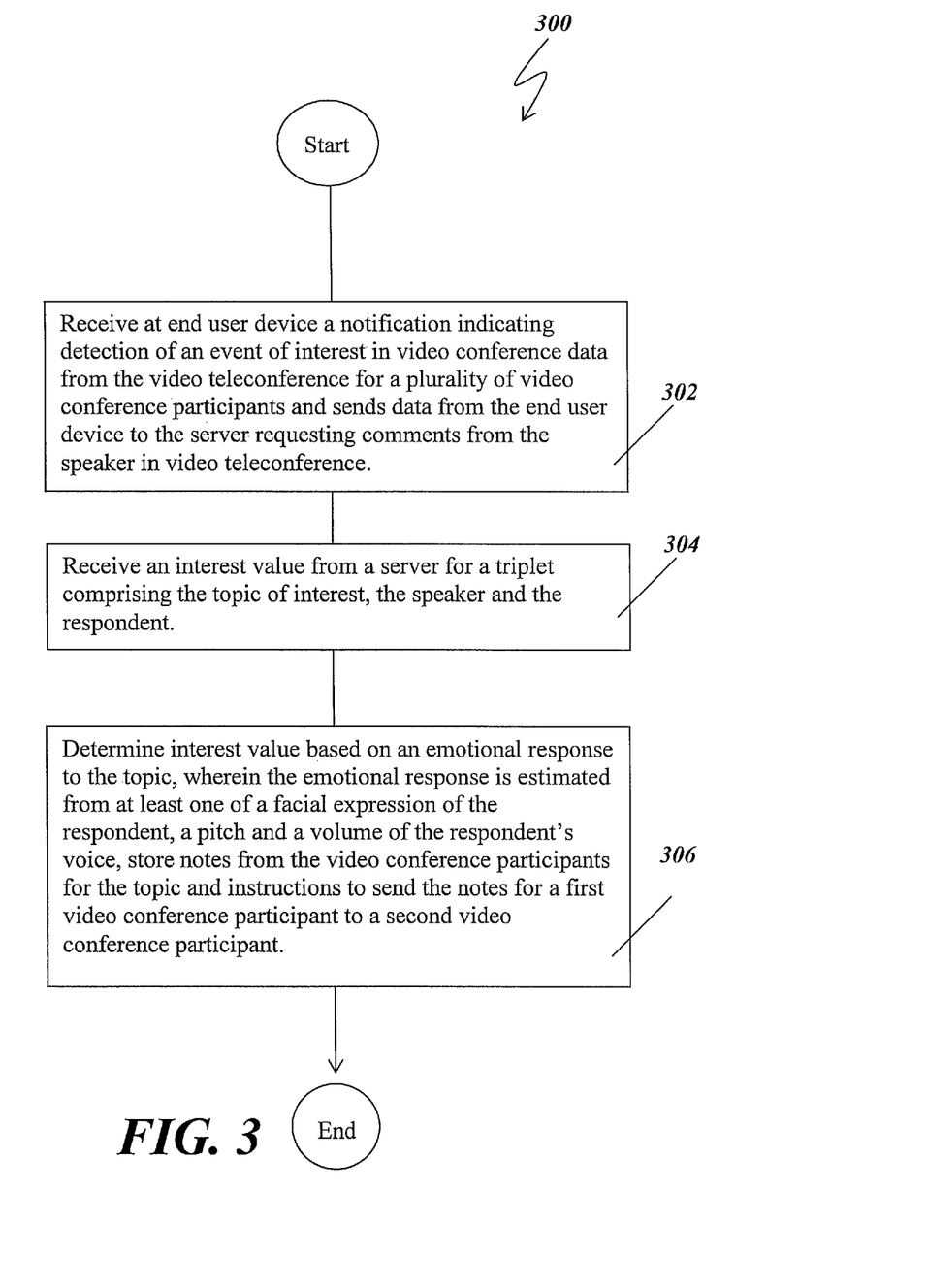
FIG. 3 depicts a flow chart of functions performed in another illustrative method an end user receiving a notice of an occurrence of an event of interest.

Turning now to FIG. 3, a flow chart 300 depicting a method for notifying an end user of an event of interest is depicted. Turning now to FIG. 3, a flow chart for a particular illustrative embodiment is depicted. At block 302 an end user receives a notification from a video conference processor indicating a detection of the event of interest in video conference data from the video teleconference for a plurality of video conference participants and sending data from the end user device to the server requesting a transcription of comments from the speaker in video teleconference.

As discussed above, the event of interest can be but is not limited to data indicating a topic of interest, a speaker of interest, increased note taking among the video conference participants, increased interest among the video conference participants and increased discussion among the video conference participants. The video conference data further includes but is not limited to audio and video data. In particular illustrative embodiment, the computer program further includes but is not limited to instructions to notify a video conference participant and end user of a general and specific interest value for the event of interest, wherein the general and specific interest values are based on a profile for the end user. The end user profile includes but is not limited to data indicating at least one of a speaker of interest, a topic of interest and combination of a speaker of interest/topic of interest. The end user can set an alert value for a particular video conference speaker, topic or combination of video conference speaker and topic. Thus, when a general or specific interest value for an event of interest meets or exceeds alert value a notification is sent to the end user or video conference participant. Thus, when an interest value for an event of interest, such as a topic of interest or a speaker of interest exceeds the alert value for the event of interest, such as a topic of interest or speaker of interest, a notification is sent to the end user or video conference participant. The notification includes but is not limited to data that indicates at least one of the speaker of interest, topic of interest, combination thereof and a general and specific interest value for the event of interest.

The interest value can further include a specific interest value for the topic that is specific to the end user. An end user and video conference participant can request and receive electronic notes for the event of interest from the video conference processor. In block 304, an end user device receives an interest value from the video conference processor for a triplet comprising the topic, the speaker and the respondent. The server can be one of a plurality of video conference processors discussed above. In block 306, the interest value is determined based on an emotional response to the topic, wherein the emotional response is estimated from at least one of a facial expression of the respondent, a pitch and a volume of the respondent's voice, instructions to store notes from the video conference participants for the topic and instructions to send the notes for a first video conference participant to a second video conference participant.

Figure 4:
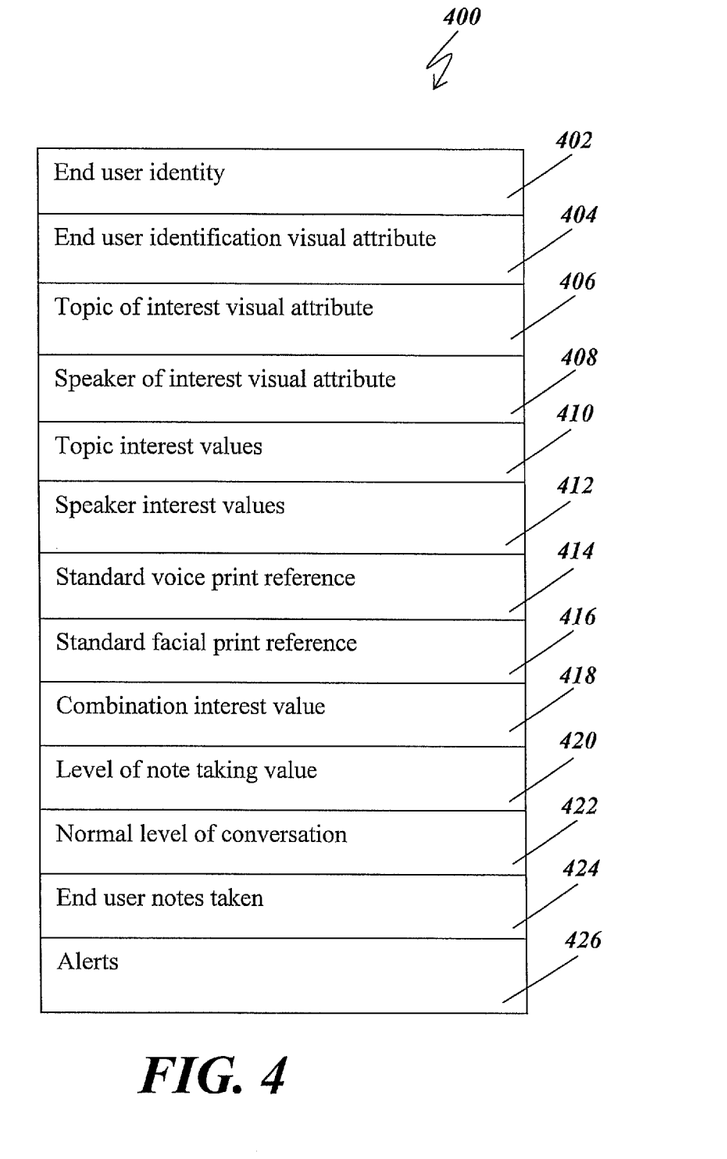
FIG. 4 depicts a data structure embedded in a computer readable medium for containing data that is used by a processor and method for notifying an end user of an occurrence of an event of interest.

Turning now to FIG. 4, in a particular illustrative embodiment a data structure 400 for containing data embedded in a non-transitory computer readable medium is depicted. The data structure is used by the method and computer program described herein to provide structure to the data and to perform useful functions in notifying a video conference participant and end user of events of interest during a video conference. As shown in FIG. 4, a first field 401 is provided in the data structure for storing data indicating an end user identity associated with the data structure. A second field 402 is provided in the data structure 400 for containing data indicating a video conference participant identification visual attribute which can include but is not limited to a color or font style and size which identifies the video conference participant to whom a particular passage in the running text or tag cloud of the video conference is attributed. A third field 404 is provided in the data structure for containing data indicating a topic of interest visual attribute which can include but is not limited to a color or text font style and size which identifies the topic of interest and text or tag associated with the topic of interest in the running text of the video conference or a tag cloud. A fourth field 406 is provided in the data structure for containing data indicating a speaker of interest visual attribute which can include but is not limited to a color or text font style and size which identifies the speaker of interest and text or tag attributed to the speaker of interest in the running text of the video conference.

A fifth field 408 is provided in the data structure for containing data indicating a specific and general interest value for a topic. Different topics having different specific and general interest values are contained in the fourth field. Specific and general interest values range from zero through ten for each speaker and topic of interest with the specific or general interest value zero being lowest interest and ten being highest interest. Topics of interest can be categorical including but not limited to finance, logistics and status. Topics of interest can also be associated with key words, such as project names or technologies. Thus a particular end user may be assigned a topic of interest value of eight for a particular category, for example, "finance" and a topic of interest value of four for another category, for example, "logistics".

In a particular embodiment, specific interest values are determined from a combination of quantity of note taking, quantity of discussion and perceived emotional response combined with an end user's input of interest value data in a profile. Interest values of zero to ten can be equated to a percentage of video conference participants taking notes on a topic or during a speaker presentation. Interest values of zero to ten can be equated to a percentage of video conference participants discussing a topic or during a speaker presentation. Interest values of zero to ten can be equated to a percentage of video conference participants demonstrating emotional interest in a topic or speaker. These values are added together with an end user's input interest values and averaged to determine specific interest values for a topic or speaker. Specific interest values for all video conference participants can be averaged to determine a general interest value in a topic or speaker.

The topic of interest values are created based on a combination of an end user's selection of a topic of interest value for a topic of interest along with an ongoing dynamic evaluation of an end user's specific interest in a particular topic of interest. Thus when an end user responds to a topic of interest the topic of interest value is increased for the end user. Interest value in a topic of interest is indicated by a video conference participant's verbal response to a mention of the topic of interest during a video conference, a video conference participant's facial expression in response to the topic of interest mentioned in a video conference, a video conference participant's tone of voice including pitch and volume when discussing the topic of interest during the video conference and a video conference participant's note taking while the topic of interest is being discussed during video conference. A video conference participant's voice print reference and facial print reference are used to determine variations from the norm to estimated emotional response to assign an emotional interest value from zero to ten as a demonstrated emotional interest to be averaged in with other note taking, etc. discussed above to determine a specific interest value.

Similarly, a sixth field 410 is provided in the data structure for containing data indicating a speaker of interest value. Different speakers having different speaker of interest values are contained in the sixth field. Speaker of interest values range from zero through ten for each speaker of interest with the value zero being lowest interest and the value ten being highest interest. The speaker of interest values are created based on a combination of an end user's selection of a speaker of interest along with a speaker of interest value and an ongoing dynamic evaluation of an end user's interest in a particular speaker of interest. Thus, whenever a particular end user or video conference participant responds to a speaker of interest, the speaker of interest value is increased for the particular end user or video conference participant. Interest in a speaker of interest is indicated by a verbal response to the speaker of interest, facial expression in response to the speaker of interest, tone of voice including pitch, a request for notes taken during the speaker of interest's presentation during the video conference and volume when talking to the speaker of interest during the video conference and note taking by the video conference participant while the speaker of interest is talking during video conference.

A seventh field 412 is provided for storing data representing a standard voice print reference for the end user identified in the profile. The voice print reference is used to identify the end user identified in end user identity field. The voice print reference is also used to gauge a perceived emotional response of the end user during speaking. The end user's verbal responses are compared to the voice print reference to estimate emotions based on deviations in volume and pitch of the end user's voice from the voice print reference. Changes in volume along with a change in pitch, higher or lower are indicative of increased interest and a speaker of interest and topic of interest so that an interest value is for topic of interest or speaker of interest is increased or decreased based the perceived emotional response.

An eighth field 414 is provided for storing data representing a standard facial print reference for the end user identified in the profile. The standard facial print reference is used to identify the end user identified in the end user identity field. The standard facial print reference is also used to gauge a perceived emotional response of the end user during a video conference when listening to a speaker of interest or a topic of interest. The end user's facial responses are compared to the facial print reference to estimate emotions based on deviations in end user's face indicating emotional response in reaction to a current speaker of interest or topic of interest.

A ninth field 416 is provided for storing data representing a combination interest value for a particular speaker of interest speaking on a particular topic of interest. The combination interest values for a particular speaker of interest on a particular topic of interest having different values are contained in the ninth field. Combination interest values range from zero through ten for each combination of a speaker of interest and a topic of interest for a particular end user identified in the end user identity field. The combination of interest values with the value zero being lowest interest and ten being highest interest. The combination interest values are created based on a combination of an end user's selection of a speaker of interest on a topic of interest along with assigning a combination interest value of zero to ten along with an ongoing dynamic evaluation of an end user's specific interest in a particular speaker of interest on a particular topic of interest. Thus when an end user responds to a speaker of interest the speaker of specific interest value is increased for the end user. Specific interest is indicated by a verbal response to the combination of the speaker of interest on the topic of interest, facial expression in response to the speaker of interest to the combination of the speaker of interest on the topic of interest, tone of voice including pitch and volume when talking with the speaker of interest on the topic of interest during the video conference and note taking while the speaker of interest is talking on the topic of interest during video conference.

A tenth field 418 is provided in the data structure for storing data indicating a note value for a level of note taking by the end user and by the group of video conference participants. The note value ranges from a value of zero to ten, with zero being the lowest level of note taking and ten being the highest level of note taking. A high level of note taking by the end user increases a specific interest value for the end user for the topic of interest, speaker of interest and combination thereof. A high level of note taking by the participants in the video conference increases a general interest value for the video conference participants in the topic of interest, speaker of interest and combination thereof.

Thus a separate note level value for the end user and the video conference values are used to formulate a notification to the end user for interest in a particular speaker of interest, topic of interest and combination thereof. A normal level of note taking can be established for a particular speaker of interest or topic of interest. Increases in note taking above the normal level increase the interest value and decreases in note taking below the normal level decrease the interest value for the particular speaker or interest or topic of interest.

An eleventh field 420 is provided in the data structure for storing data indicating a normal level of conversation in the video conference by the end user and by the group of video conference participants for a particular speaker of interest and or topic of interest. The level of conversation value ranges from a value of zero to ten, with zero being the lowest level of conversation and ten being the highest level of conversation. A high level of conversation by the end user increases an interest value for the end user in the topic of interest, speaker of interest and combination thereof A high level of conversation by the video conference participants increases a general interest value for the video conference participants in the topic of interest, speaker of interest and combination thereof. Thus a separate conversation value for the end user and the video conference participants are used to formulate a notification to the end user for interest in a particular speaker of interest, topic of interest and combination thereof. A normal level of conversation between video conference participants can be established for a particular speaker of interest or topic of interest. Increases in conversation between video conference participants above the normal level increase the general interest value and decreases in conversation between video conference participants below the normal level decrease the interest value for the particular speaker or interest or topic of interest.

A twelfth field 422 is provided for storing data indicating end user notes taken during the video conference by the end user identified in the end user identity field. The notes are time stamped to particular portion of the video conference. The notes can be sorted by association with particular topics of interest and speakers of interest. These notes are made available for others upon request. The end users whom request and display the notes are presented in a visual attribute indicating an end user, speaker or interest or topic of interest associated with notes. A thirteenth field 424 is provided for storing alert values for particular events of interest. The event of interest is defined along with a specific and general interest value for which a notification should be sent to the end user identified in the end user profile. A notification is sent to an end user when a specific or general interest value meets or exceeds the alert value for the event of interest.

Figure 5:
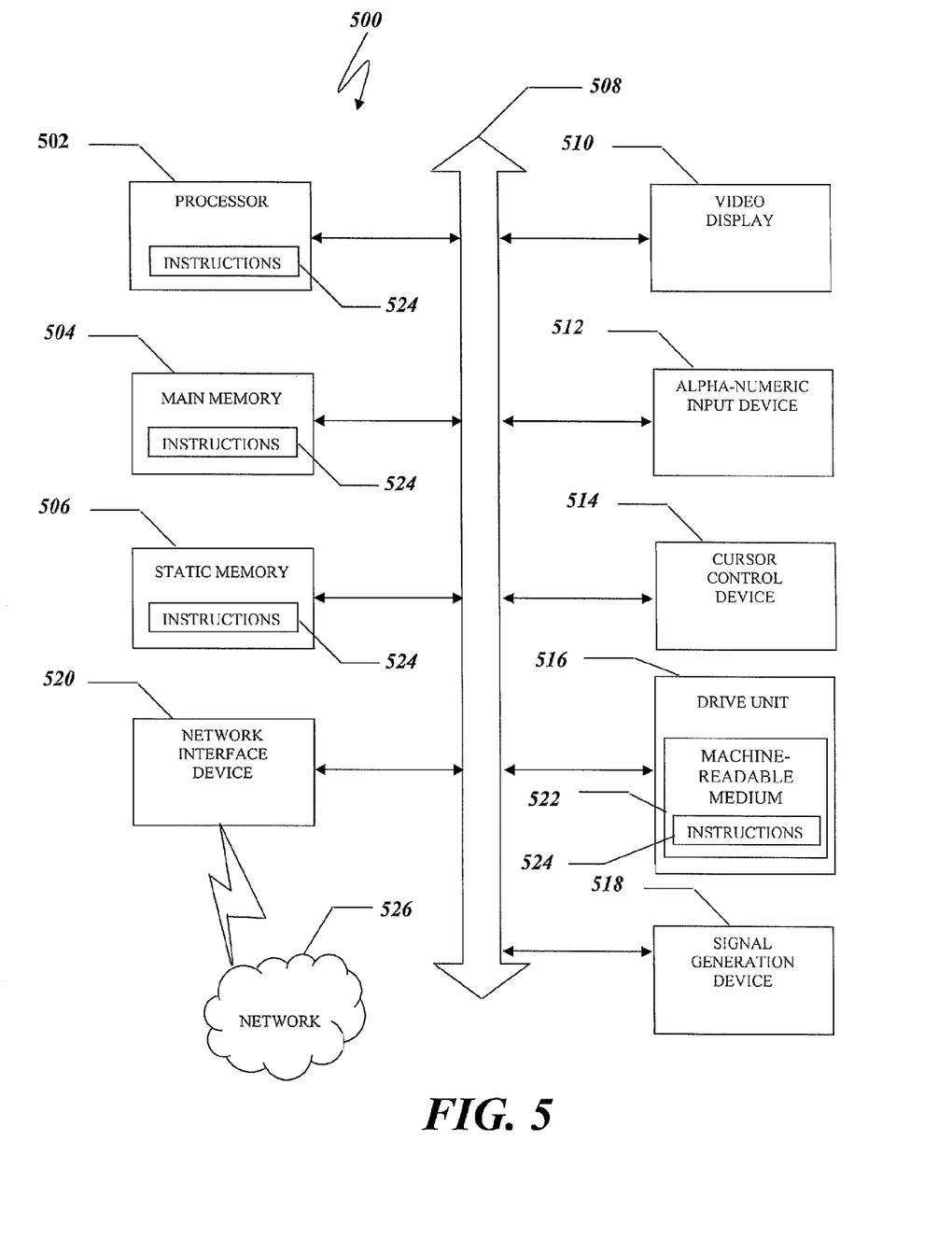
FIG. 5 is an illustrative embodiment of a machine for performing functions disclosed in an illustrative embodiment.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein. The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., liquid crystals display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface.

The disk drive unit 516 may include a computer-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute computer-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a non-transitory machine readable storage medium containing instructions 524, so that a device connected to a network environment 526 can send or receive voice, video or data, and to communicate over the network 526 using the instructions 524. The instructions 524 may further be transmitted or received over a network 526 via the network interface device 520. The non-transitory machine readable storage medium may also contain a data structure for containing data useful in providing a functional relationship between the data and a machine or computer in an illustrative embodiment of the disclosed system and method.

While the non-transitory computer-readable storage medium 522 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. The figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method, the method comprising:
    detecting increased note taking from end user devices among video conference participants at a plurality of end user devices;
    detecting at a video conference processor an event of interest in video conference data based on the detecting increased note taking from end user devices among the video conference participants a plurality of video conference participants; and
    notifying an end user at an end user device of the event of interest.

2. The method of claim 1, wherein detecting the event of interest further comprises detecting increased discussion among the video conference participants.

3. The method of claim 2, wherein the video conference data further comprises audio and video data, the method further comprising:
    notifying the end user at the end user device of an interest value for the event of interest based on a profile for the end user, wherein the end user profile comprises data indicating a topic of interest.

4. The method of claim 3, wherein the interest value further comprises a specific interest value for the topic that is specific to the end user, the method further comprising:
    sending to the end user device, electronic notes from the video conference for the event of interest.

5. The method of claim 4, wherein the method further comprises:
    identifying a respondent from the video conference participants that responds to the speaker regarding the topic of interest; and
    creating an interest value for the topic of interest, the speaker and the respondent.

6. The method of claim 5, the method further comprising:
    determining a level of interest based on an emotional response to the topic of interest, wherein the emotional response is estimated from a facial expression of the respondent.

7. The method of claim 1, the method further comprising:
    storing notes from the video conference participants for the topic in a non-transitory computer readable storage medium; and
    sending the notes for a first video conference participant to an end user device for a second video conference participant.

8. A computer readable medium comprising:
    a non-transitory computer readable medium containing computer program instructions that when executed by a computer, performs functions that are useful notifying an end user of an event of interest, the computer program comprising:
    instructions to detect increased note taking from end user devices among the video conference participants; and
    instructions to detect the event of interest in video conference data for a plurality of video conference participants based on the increased note taking;
    and instructions to send data to an end user device to notify an end user of the event of interest.

9. The computer readable medium of claim 8, wherein the instructions to detect further comprise instructions to detect increased discussion among the video conference participants.

10. The medium of claim 8, wherein the video conference data further comprises audio and video data, the computer program further comprising instructions to
send data to an end user device to notify the end user of an interest value for the event of interest based on a profile for the end user, wherein the end user profile comprises data indicating at least one of a speaker of interest and a topic of interest.

11. The medium of claim 10, wherein the interest value further comprises a specific interest value for the topic that is specific to the end user, the computer program further comprising instructions to send to the end user device, electronic notes from the video conference for the event of interest.

12. The medium of claim 11, wherein the computer program further comprises instructions to identify a respondent from the video conference participants that responds to the speaker regarding the topic and instructions to creating an interest value for the topic of interest, the speaker video conference participant and the respondent video conference participant.

13. The method of claim 12, the computer program further comprising instructions to determine a level of interest based on an emotional response to the topic, wherein the emotional response is estimated from at least one of a facial expression of the respondent, a pitch of the respondent's voice and a volume of the respondent's voice.

14. The medium of claim 8, the computer program further comprising:
instructions to store notes from the video conference participants for the topic; and
instructions to send the notes for a first video conference participant to a second video conference participant.

15. A computer implemented method for receiving at an end user device, a notification of an event of interest in a video teleconference, the method comprising:
taking notes on a first one of a plurality of end user devices during the video teleconference;
receiving at a second one of the plurality of end user devices from a server, a notification indicating a detection of the event of interest in video conference data from the video teleconference for a plurality of video conference participants, wherein the event of interested is detected by increased note taking by the end user devices during the video teleconference; and
sending data from the end user device to the server requesting a transcription of comments from the speaker in video teleconference.

16. The method of claim 15, wherein the event of interest is one of a topic of interest, a speaker of interest, increased note taking among the video conference participants, increased interest among the video conference participants and increased discussion among the video conference participants.

17. The method of claim 15, wherein the video conference data further comprises audio and video data, the computer program further comprising instructions to
notify the end user of an interest value for the event of interest, wherein the interest value is based on a profile for the end user, wherein the end user profile comprises data indicating at least one of a speaker of interest and a topic of interest.

18. The method of claim 17, wherein the interest value further comprises a specific interest value for the topic that is specific to the end user, the computer program further comprising instructions to receive at the end user device, electronic notes for the event of interest from the server.

19. The method of claim 18, wherein the computer program further comprises instructions to receive at the end user device, an interest value from a server for a triplet comprising the topic, the speaker and the respondent.

20. The method of claim 18, wherein the interest value is determined based on an emotional response to the topic, wherein the emotional response is estimated from at least one of a facial expression of the respondent, a pitch and a volume of the respondent's voice, instructions to store notes from the video conference participants for the topic and instructions to send the notes for a first video conference participant to a second video conference participant.

* * * * *